Figure 1:
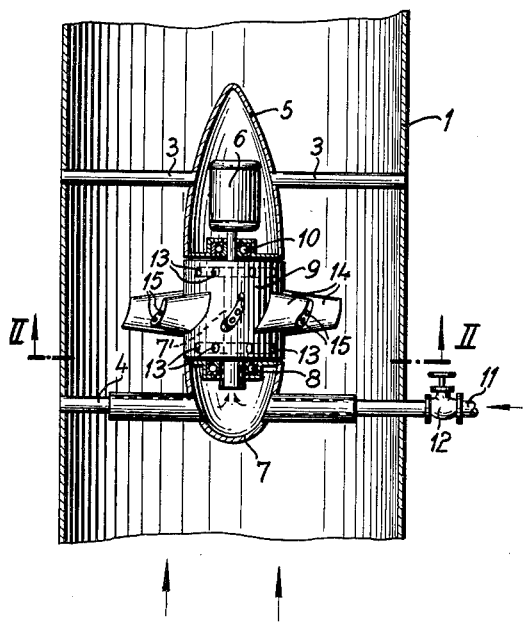

Jan. 16, 1962     O. SCHMID     3,016,979
PROCESS AND CONTRIVANCE FOR SEPARATING SOLID OR
LIQUID PARTICLES FROM GASES OR VAPOURS
Filed May 26, 1960     2 Sheets-Sheet 1

INVENTOR:
Otto SCHMID
BY
ATTYS.

Jan. 16, 1962     O. SCHMID     3,016,979
PROCESS AND CONTRIVANCE FOR SEPARATING SOLID OR
LIQUID PARTICLES FROM GASES OR VAPOURS
Filed May 26, 1960     2 Sheets-Sheet 2
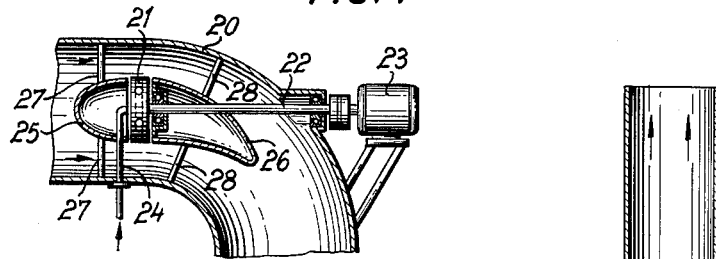
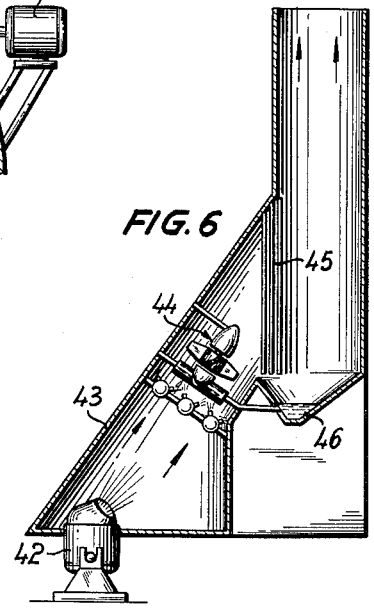
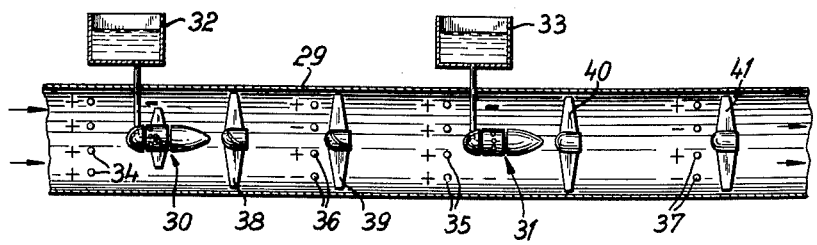
INVENTOR:
Otto SCHMID

United States Patent Office 3,016,979
Patented Jan. 16, 1962

3,016,979
PROCESS AND CONTRIVANCE FOR SEPARATING SOLID OR LIQUID PARTICLES FROM GASES OR VAPOURS
Otto Schmid, Bregenz, Austria, assignor to Etablissement Aeromix, Vaduz (Furstentum), Liechtenstein
Filed May 26, 1960, Ser. No. 31,997
Claims priority, application Germany July 7, 1953
10 Claims. (Cl. 183—7)

This invention relates to a method of separating solid or liquid particles from industrial gases or vapours heavily contaminated with these by means of water or an aqueous solution.

In order to obtain a high degree of separation of very fine solid or liquid particles it is necessary to atomize the water to droplets having a size similar to those of the particles to be separated. In this way a very high degree of separation can be obtained even with fine particles having a size of below 1 micron.

Hitherto, this separation has been effected by convergent/divergent channels of the Venturi type through which the particle-containing gases are passed and in which the wetting liquid is introduced usually at the constricted section and in one form of Venturi arrangement is atomized by the gas flow (Pease Anthony gas scrubber).

In order to produce very fine droplets which are particularly effective for the separation of particles high relative speeds are necessary between the gas and the water droplets introduced.

A disadvantage of the Venturi type separators lies in the fact that high working pressures are necessary to produce the necessary high gas speeds for production of fine droplets. Therefore, high working costs are involved since it is necessary to reduce the high gas speed existing at the most constricted section of the Venturi tube after passing this section back to the normal speed of gas flow by the divergent section of the Venturi (the diffuser) which involves a considerable energy loss. At the same time it is also necessary to provide in the gas stream the energy for atomizing the water to very fine droplets which necessitates a considerable velocity at the constricted section of the Venturi.

Thus, in a typical installation, about 200 H.P. might be necessary for doing this and the velocity of the gas stream might be increased from about 3000 feet per minute to about 18,000 feet or more per minute at the point of constriction in order to achieve the atomization of the water drops. This power input is then principally lost in the reduction of the high gas velocity after the point of constriction has been passed (diffuser loss).

Quite apart from the considerable energy requirements of a single Venturi arrangement, the energy requirements of more than one Venturi arrangement in series would be completely prohibitive.

Installations of this type frequently are required to deal with a varying rate of gas flow. The atomizing action of the gas flow in the Venturi, however, differs as the square of the gas speed at the restricted section. Thus if the rate of gas flow drops the atomizing action will rapidly become less efficient with consequent deterioration in the efficiency of removal of the solid or liquid particles.

Another form of separator for fine particles which has been used is of the kind which employs nozzles for the atomizing of the water. These installations, however, suffer from a number of disadvantages. In the first place, if the speed of gas flow is being reduced and therefore the amount of water to be supplied has to be reduced accordingly, the nozzles will produce larger droplets when the water flow is reduced and these will not be efficient for removal of the particles, since as previously explained, the droplets should be of the same size as the particles to be removed.

Another disadvantage of the use of nozzles is that these cannot be used with dirty water since dirty water would cause blocking of the nozzles and, in any event, would cause considerable wear of the fine nozzle orifices.

Thus the consumption of water by such installations would be high, first because the supply of water to them would have to be maintained at the same level irrespective of the gas flow and recirculation of the dirty water would not be possible.

A further disadvantage with the nozzle type of installation is that to achieve a uniform distribution of atomized particles across the cross section of the gas passage a very large number of finely distributed nozzles would be necessary, since the atomized particles would only be distributed in the vicinity of the nozzle itself.

In another form of water atomizing installation the atomizing of water drops has been achieved by impact of the drops against blades.

These installations tend to produce a wide variety of atomized particle size and also the impact of the water drops on the blades causes higher wear of the blades by cavitation or erosion, especially in the event that re-circulated dirty water is used. It would thus, in any event, be impossible to use re-circulated water with an installation of this type, when the dust content of the gas flow is high, as in the case with industrial gases or vapours. Also it is not possible to produce very small water droplets using this impact method.

In still another type of installation in which rotating nozzles are utilized, the wetting liquid discharged from the nozzles is at the moment of its discharge already atomized. This has the result that the atomized liquid emerging from the rotors in the form of droplets which have, for example, a size in the order of magnitude between 1 and 50 microns, will penetrate only very slightly into the gas-filled cross-section of the gas pipe so that a major portion of the cross-section and thus a major proportion of the dust particles contained in that cross-section will remain completely unwetted.

It is an object of the present invention to provide an apparatus and a method of producing similar results to the Venturi arrangement but with a considerably less expenditure of energy and in a manner which can be repeatedly applied to the same gas stream in order to ensure a highly efficient elimination of dust or liquid particles therein.

The present invention consists of both an apparatus for and a method of separating solid or liquid particles from gases and which comprises passing the gases through a passage of a diameter exceeding about three feet, passing water or an aqueous solution within the passage, and submitting it to rotation about an axis extending along the passage to drive it by centrifugal force along rotating generally radial channels, expelling the water from the ends of the radial channels at a radius from the axis and a rotational velocity such that it passes into the space of the passage in drops having a size between 3 and 10 mm. at a velocity at right angles to the direction of flow of greater than 10,000 feet per minute whereby the drops are atomized by their speed of passage through the gas to the desired size of between about 0.5 and 50 microns to form a uniformly distributed spray of atomized water or aqueous solution across the passage for coalescing with the solid or liquid particles to be removed from the gas.

By this means the same relative velocity between the water drops and the gas can be obtained as in the case of the Venturi and in consequence the same degree of atomization and formation of uniformly distributed atomized particles but with very much reduced expenditure of energy.

Also the size of water droplets produced will be constant independently of either the rate of water flow or of the rate of gas flow, which is not the case with previous types of installations using a Venturi or nozzles.

Thus, in order that the rate of flow of water or aqueous solution into the passage may be varied in accordance with the rate of flow of gas through the passage, large channels may be used which will be only partially filled.

With the method according to the invention the free cross-sectional area of the passage may be covered with uniformly distributed atomized particles either in the manner just described or, in the case of passages of greater diameter, by means of a plurality of arrangements of the kind described. These might take the form of a plurality of arrangements distributed across the section of the passage in some way or another, or alternatively, a first set of rotating generally radial channels might be provided, and in addition a second set extending to a greater radius than the first set, the first set covering the free area of the passage as far out as the radius at which the second set commences and the second set filling the free space of the passage from that point out to the external walls of the passage.

In the case when the gases are hot it may be advisable first to supply them in their flow through the passage with large drops of water at one position whereby they may be cooled and humidified by the evaporation of the water in the large drops and subsequently to pass these gases through an arrangement of the kind according to the invention.

The invention will be described further with reference to embodiments shown in the accompanying drawings.

Figure 3:
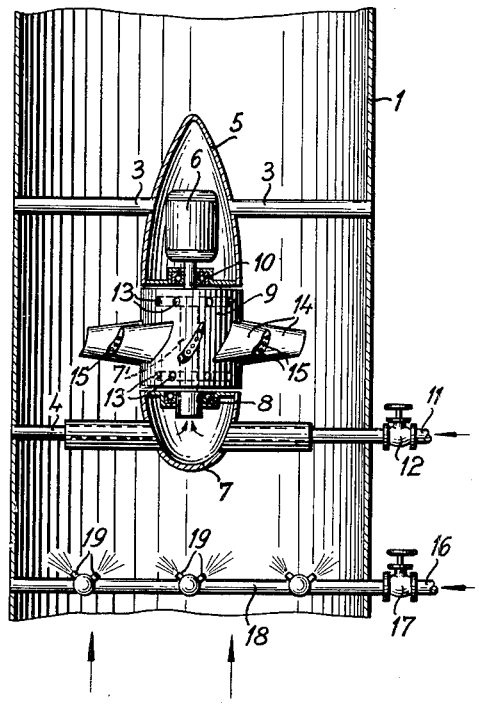
Figure 2:
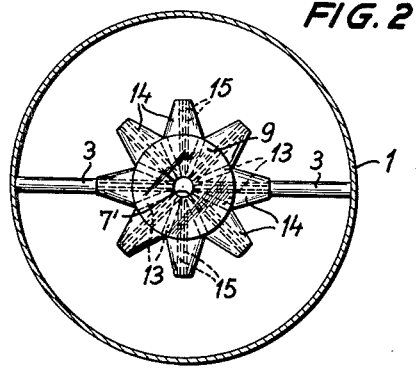

FIGURE 1 is a plan view of an installation according to the invention partly in section, FIGURE 2 is a section on the line II—II of FIGURE 1, FIGURE 3 is a similar view to FIGURE 1 of a modified embodiment, FIGURE 4 is a plan view partly in section of a modified arrangement suitable for a bent flow passage in which arrangement the motor is mounted externally of the passage, FIGURE 5 shows in side elevation in partial section a complete installation according to the invention having two sets of water atomizing arrangements mounted in series in the passage, and FIGURE 6 is a diagram of an end view partly in section of an installation according to the invention for use with a Bessemer converter.

Within the passage 1 for the gas flow which may be, say, 9 feet in diameter, is rigidly supported by means of arms 3, 4 respectively, an aerodynamically faired casing 5 for supporting an electric motor 6 and an aerodynamically faired casing 7 which carries a bearing 8. A rotor 9 of, say, 3 feet in diameter, is supported for rotation by means of the motor 6 between a bearing 10 in the casing 5 and the bearing 8 in the casing 7. The shaft of the rotor 9 supported in the bearings 8 and 10 is a hollow one and is arranged to be fed with water from a pipe 11 over a valve 12 through one of the supports 4 which is hollow and the hollow casing 7. The rotor 9 is formed with radial passages 13 adjacent each end and intermediate of these is formed with fixed aerofoil section blades 14 extending out to a diameter of, say, 5 feet through which also extend radial passages 15 opening out at the ends of the blades. The width of the passages 13 and 15 are such that the drops of liquid radially discharged therefrom are between 3 and 10 mm. The passages 13 and 15, as shown, extend radially from the feed duct 7' without constriction. As shown in the table below, the depth of penetration of water drops into still air increases with extreme rapidity as the size of the drops is increased, the initial velocity of the drops being 50 meters (164 ft.) per sec. While the maximum depth of penetration up to a point where the drop comes to a standstill is only 0.00015 m. in the case of a drop 1 micron in diameter, and while even with a drop diameter of 50 microns the maximum depth of penetration is only 0.255 m., a drop diameter of 10 mm. will result in a maximum depth of penetration of 176.4 m., the maximum depth of penetration of a drop having a diameter of only 1 mm. being even as high as 12.2 m.

In the case of the object of the invention, however, the drops do not emerge from a stationary passage into the still air, but they are discharged from radial passages provided in a rotor which revolves at a high speed. From this it will be understood that the drops emerging from the passages will follow a path approximately resembling an Archimedean spiral within the gas pipe. The length of travel, i.e., the distances covered by the drops along such Archimedean spirals, will hardly undergo any change.

Assuming now that the drops emerging from the passages of the rotor will be atomized down to the desired final size of between about 0.5 and 50 microns within a time of approximately 1/100 of a second, it will be seen from the table that with a drop size of about 1 to 50 microns as obtained with the use of nozzles the depth of penetration of the drops discharged by the rotor is disproportionately small, so that only a fraction of the total cross-section of the gas pipe can be wetted. From this it follows that, according to the invention, it is important to provide no nozzles at the exit ends of the rotor passages so as to ensure that drops having a size of, say, between 3 and 10 mm. are discharged by the passages whose ends are not constricted. Only in the latter case can one be certain, if the relative velocity between the drops emerging from the passages and the gas stream is sufficiently high, that these drops, by the time they have been atomized to the desired size of between about 0.5 and 50 microns, will have penetrated far enough into the pipe cross-section so as to ensure efficient wetting of the gas throughout the cross-section of the pipe.

For an initial velocity of 50 meters per second, the following relation between the size of a water drop and its depth of penetration holds true and can be demonstrated mathematically:

| Drop Diameter in mm. and in microns | | Depth of Penetration in meters |
| --- | --- | --- |
| Microns | mm. | |
| 1 | 0.001 | 0.00015 |
| 10 | 0.01 | 0.015 |
| 15.45 | 0.0155 | 0.0358 |
| 18 | 0.018 | 0.04825 |
| 30 | 0.03 | 0.1168 |
| 50 | 0.05 | 0.255 |
| 100 | 0.1 | 0.6745 |
| 300 | 0.3 | 2.796 |
| 1000 | 1 | 12.2 |
| 3000 | 3 | 44.36 |
| 10,000 | 10 | 176.4 |

The arrangement of FIGURE 3 is in all respects similar to that of FIGURES 1 and 2, except for the provision of an additional water supply pipe 16, valve 17 supplying a distribution pipe 18 across the passage 1 provided at intervals with nozzles 19.

In operation of the arrangement according to FIGURES 1 and 2, part of the gas flow through the passage cooperates with the droplets emerging from the rotor from the two sets of channels 13 shown in the drawings to atomize them. In a typical installation the electric motor 6 might be of, say, 80 H.P. in order to achieve a peripheral velocity at the outlet of the channels 13 of, say, 18,000 feet per minute. The water drops from the outlet of the channels 13 will thus have a generally radial velocity which is the vector sum of the radial velocity due to centrifugal force and the circumferential velocity of the rotor.

This velocity is sufficient to cause the atomization of the droplets in their passage through the gas flow to a size equivalent to that of the particles to be removed. By the time the droplets have reached a radial distance from the axis of the passage about equivalent to that of the tips of the blades 14, all of the droplet particles will have been atomized. In order therefore to completely fill the free space in the passage with atomized particles the droplet flow from the ends of the channels 15 at the tips of the blades 14 is effective to fill the space from the tips to the periphery of the passage because they are ejected by centrifugal force in the radial direction and will, of course, have a speed which is the vector sum of this radial velocity and the circumferential velocity due to rotation of the rotor.

A uniform distribution of atomized water particles throughout the whole of the free cross section of the passage is thus achieved.

When hot gases are being used it may be necessary to cool and humidify these in order to prevent evaporation of the droplets. To this end the additional water supply to the nozzles 19 of the arrangement of FIGURE 3 may be provided.

If it is desired to mount the motor externally to the passage for ease in maintenance this result may be achieved by using a bent passage 20 of the form shown in FIGURE 4 which is a simplified representation of the arrangement of FIGURES 1 and 2, and in which the rotor 21 is not provided with blades 14 and is driven over a shaft 22 by the motor 23 mounted on the outside of the passage 20. Water is supplied through the pipe 24 and the aerodynamically faired casings 25 and 26 and supported by arms 27, 28 respectively, as before.

In FIGURE 5 within the passage 29 there are two complete installations 30 and 31, 30 similar to that described with reference to FIGURES 1 and 2, and 31 also similar except that no blades 14 are provided. The water supply is shown diagrammatically as coming from tanks 32, 33 respectively. Positively charged grids 34 are provided in the passage 29 in front of installations 30, 31 respectively, which themselves are negatively charged and mixed positive and negative charged grids 36 and 37 are provided after the installations 30 and 31. Stationary deflecting blades 38, 39, 40 and 41 are provided at spaced positions in the passage to improve mixing of the gas flow.

The solid or liquid suspended particles enter the gas conducting channel 29 in the direction of the arrows. They are charged positively by the grid 34 and unite with the electro-negative particles of liquid, atomized by the atomizer 30 in the region following the blades 38 to form moist electrically neutral particles. After passing the grid 36 charged with electricity of opposite sign they unite in the region following the stationary blades 39 to form larger, electrically neutral particles.

They are charged again electro-positive by the grid 35 charged with positive electricity and unite with the electro-negative particles atomized by the atomizer 31 to form electrically neutral particles in the region following the stationary blades 40. After passing the grid 37 charged with electricity of opposite sign they unite in the region following the stationary blades 41 again to form larger, stable and electrically neutral particles which can now be separated by simple separators of known types. If the particle size is still insufficient for a good separation, further installations of this kind may be used along the passage 29.

In case of an acid fog, an alkali may be atomized by the atomizer 30. As a result, the suspended particles formed are chemically neutral salts which, charged by the grid 36 charged with electricity of both signs, stick together to form larger suspended particles. These are wetted, e.g. with water, by the atomizing unit 31 and are charged again by the grid 37 with electricity of both signs. They leave the chamber at a markedly increased particle size and, due to their size, can easily be separated by a subsequently arranged separator.

In FIGURE 6 is shown a complete gas cleaning installation comprising a Bessemer converter 42 located under a chimney 43 in which is mounted an atomizer 44 of the kind described with reference to FIGURES 1, 2 and 3. Following the atomizer 44 are arranged a baffle separator 45 which leads the collected water containing the particles down to a reservoir 46 while allowing the cleaned gas to pass up the chimney in the direction of the arrows.

The water from reservoir 46 is drawn up into the atomizer 44 and re-used so that there is a continuous circulation of the dirty water.

What is claimed is:

1. A method of separating particles having a magnitude of about one micron or less from gases, comprising the steps of passing the gases through a passage of a diameter exceeding about three feet, passing liquid within the passage and submitting it to rotation about an axis extending along the passage to drive it by centrifugal force along rotating generally radial channels of substantially uniform diameter, expelling the liquid in nonatomized form from the outer ends of the radial channels and at a rotational velocity such that it passes into an unobstructed space of the passage in drops at an initial velocity at right angles to the direction of gas flow of greater than ten thousand feet per minute and of a size to completely penetrate the gases to atomize the drops by their speed of travel through the gases to a size approximately that of the particles to be separated and before reaching the wall of the passage to form a uniformly distributed spray of atomized liquid across the remainder of the diameter of the passage for coalescing with the particles to be removed from the passage.

2. A method as claimed in claim 1, in which the rate of flow of liquid into the passage is varied in accordance with the rate of flow of gases through the passage.

3. A method as claimed in claim 1, collecting the coalesced particles and liquid and repassing the collected liquid within the passage for reatomization.

4. A method as claimed in claim 1, including the further steps of applying an electrical charge to the particles to be separated, applying an opposite electrical charge to the droplets of liquid produced by atomization, mixing the particles and droplets by turbulence to cause complete union of the oppositely charged particles and droplets to provide moist suspended electrically neutral particles.

5. A method as claimed in claim 4, including the further steps of applying electrical charges of opposite sign to respective different portions of the moist neutral suspended particles, mixing the different portions by turbulence to form complete union into larger electrically neutral portions.

6. A method of separating particles having a magnitude of about one micron or less from gases, comprising the steps of passing the gases through a passage of a diameter exceeding about three feet, passing liquid within the passage and submitting it to rotation about an axis extending along the passage to drive it by centrifugal force along a first set of rotating generally radially projecting channels and along a second set of generally radially projecting channels extending to a greater radius than the first set, expelling the liquid from the ends of the respective sets of radial channels into an unobstructed portion of the passageway in drops having a diameter of between 3 to 10 mm. at an initial relative velocity at right angles to the direction of gas flow, dependent on the radial length and speed of rotation of the channels, which is greater than ten thousand feet per minute to atomize the drops by their speed of passage through the gases to a size substantially that of the particles to be separated and before reaching the wall of the passage to form together a uniformly distributed spray of atomized liquid across the unobstructed passage space for coalescing with the particles to be removed from the gases.

7. A method of separating particles having a magnitude of about one micron or less from hot gases, comprising the steps of passing the gases through a passage of a diameter exceeding about three feet, passing water into the passage in the form of large drops at one position across the passage for evaporation of the water into the gases to cool and humidify them, passing liquid within the passage at a position therein reached by the gases after being cooled and humidified, and submitting the liquid to rotation about an axis extending along the passage to drive it by centrifugal force along a set of rotating generally radial channels, expelling the liquid from the ends of the radial channels into an unobstructed portion of the passage in drops having a diameter of between 3 to 10 mm. at an initial velocity at right angles to the direction of gas flow, dependent on the radial length and speed of rotation of the channels, which is greater than ten thousand feet per minute to atomize the drops by their travel through the gases to a size substantially that of the particles to be separated and before reaching the wall of the passage to form a uniformly distributed spray of atomized water across the passage space for coalescing with the solid or liquid particles to be removed from the gases.

8. A method of separating particles from gases and which particles have a magnitude of about one micron or less comprising, passing the gases through a passage of a diameter exceeding about three feet, projecting drops of liquid at right angles to the direction of gas flow through an unobstructed portion of the passage of a size to completely penetrate the gases within the passage and at an initial velocity relative thereto greater than ten thousand feet per minute to atomize the drops of liquid before reaching the wall of the passage by their speed of travel through the gases to a size approximately that of the particles to be separated, and to form a uniformly distributed spray of atomized liquid diametrically of the passage for coalescing with the particles to be separated from the gases.

9. An apparatus for separating particles of about one micron or less from gases, comprising a passageway for the gases of a diameter exceeding substantially three feet, a member mounted within said passageway for rotation about the axis thereof, said member including an axially extending duct, conduits leading radially outward from the duct and projecting therefrom a predetermined distance into the interior of the passageway for the gases and having outlet openings at their outer ends, the passageway at the location of the conduits being unobstructed outwardly thereof, means for supplying liquid through the ducts to the conduits, and means for rotating said duct and conduits at a speed to project drops of the liquid from the outlet openings into said unobstructed portion of the passageway by centrifugal force transverse to the direction of gas flow at an initial velocity of greater than ten thousand feet per minute, the outlet openings being of such size as to provide drops of a size capable of completely penetrating the passageway and atomizing the drops before they reach the wall of the passageway to a size approximately that of the particles to be separated, by their speed of passage through the gases to form a uniformly distributed spray of atomized liquid across the remainder of the diameter of the passage for coalescing with the particles to be removed from the gases.

10. An apparatus as defined in claim 9 and including a second plurality of conduits arcuately spaced about the duct and rotatable therewith, axially spaced from the first named conduits and leading radially outward from the duct in the member to a greater extent than the first named conduits, said second plurality of conduits having outlet openings in their outer ends of such size as to project drops of liquid supplied thereto from the duct in the member which are capable of completely penetrating the gases.

References Cited in the file of this patent

UNITED STATES PATENTS

| | | |
|---|---|---|
| 1,002,810 | Latta | Sept. 5, 1911 |
| 1,098,389 | Lister | June 2, 1914 |
| 2,252,982 | Roberts | Aug. 19, 1941 |
| 2,357,355 | Penney | Sept. 5, 1944 |
| 2,579,441 | Palmer | Dec. 18, 1951 |
| 2,668,698 | Rollins | Feb. 9, 1954 |